(12) United States Patent
Han

(10) Patent No.: US 7,166,145 B1
(45) Date of Patent: Jan. 23, 2007

(54) RECOVERY OF PRECIOUS METALS

(75) Inventor: Kenneth N. Han, Rapid City, SD (US)

(73) Assignee: South Dakota School of Mines and Technology, Rapid City, SD (US)

(*) Notice: Subject to any disclaimer, the term of this patent is extended or adjusted under 35 U.S.C. 154(b) by 120 days.

(21) Appl. No.: 10/754,877

(22) Filed: Jan. 9, 2004

(51) Int. Cl.
*C22B 11/00* (2006.01)
(52) U.S. Cl. .................................................. 75/744
(58) Field of Classification Search .................. 75/744, 75/741, 732; 423/22, 23, 32, 33, 27, 30, 423/34; 205/570
See application file for complete search history.

(56) References Cited

U.S. PATENT DOCUMENTS

| | | | | |
|---|---|---|---|---|
| 5,308,381 A | * | 5/1994 | Han et al. ..................... | 75/744 |
| 5,328,669 A | * | 7/1994 | Han et al. ..................... | 423/32 |
| 5,542,957 A | * | 8/1996 | Han et al. ..................... | 75/732 |
| 6,471,743 B1 | * | 10/2002 | Young et al. .................. | 75/739 |
| 2003/0129112 A1 | * | 7/2003 | Vinals Olia et al. .......... | 423/22 |

* cited by examiner

*Primary Examiner*—Roy King
*Assistant Examiner*—Kathleen McNelis
(74) *Attorney, Agent, or Firm*—Gordon & Rees LLP

(57) ABSTRACT

This invention relates to the recovery of precious metals and, more particularly, to the recovery of precious metals, such as platinum group metals, gold and rhenium, from various sources using a solution comprising at least one ammonium salt, at least one halogen salt and at least one oxidant.

45 Claims, 1 Drawing Sheet

RECOVERY OF PRECIOUS METALS

FIELD OF THE INVENTION

This invention relates to the recovery of precious metals and, more particularly, to the recovery of precious metals, such as platinum group metals, gold and rhenium, from various sources using a solution comprising at least one ammonium salt, at least one halogen salt and at least one oxidant.

BACKGROUND

Platinum group metals (platinum, iridium, osmium, palladium, rhodium and ruthenium), gold and rhenium are used in a multitude of ways in various industries, such as automobile, electrical and electronic, dental and medical, petroleum refining and numerous chemical industries. The major primary source of platinum group metals, gold and rhenium is from ores and complex ores frequently containing non-ferrous metal sulfide deposits, such as Cu—Ni deposits. An increasingly important source of platinum group metals, gold and rhenium, especially in the United States, is that of secondary sources, particularly scrap of ceramics, glass, electrical and computer components and spent catalysts, e.g., from petroleum refineries and automobile catalytic converters.

For example, about 45 million automobiles are scrapped worldwide every year, including more than 15 million in the United States alone. Many of these automobiles have catalytic converters containing platinum group metals, gold and/or rhenium in sufficient quantities to warrant recovery attempts. For example, approximately 60% of scrap catalytic converters are collected to recover platinum group metals at a recovery value of approximately $35–40 per catalytic converter.

Platinum group metals, gold and rhenium frequently are incorporated with rare earth elements, such as cerium, lanthanum and neodymium, which are imbedded into the catalyst matrix consisting primarily of aluminum and silicon oxides. Effective extraction of these rare earth elements usually facilitates the recovery of platinum group metals from these catalysts.

Because platinum group metals, gold and rhenium are regarded as chemically noble, their extraction from various source materials is relatively very difficult and very expensive. Aqua regia (HCl/HNO$_3$) and concentrated HCl/Cl$_2$ solutions have been used in the precious metals industry to put these metals into solution. However, these reagents are chemically strong. It is very difficult and expensive to safely and efficiently handle these reagents under the concentrations used in the industry. The high acidity concentrations also make reagent recycling exceptionally difficult. The necessary neutralization of acid strength before metal extraction from the solution increases costs and inefficiencies.

Extracting platinum group metals, gold and/or rhenium from automobile catalysts is also relatively difficult and expensive, particularly due to the problems associated with handling the acids employed and the high cost of reagent consumption. The chemicals and methods commonly used to process these metals tend to dissolve even silica and alumina, which frequently make up the base matrix holding the platinum group metals. As a result, existing processes generally suffer from high acid consumption and severe acid corrosion problems.

A non-acidic process of dissolving platinum group metals has been introduced, which appears to be an improvement in metallurgical efficiency in some aspects. However, a major reactant of this non-acidic process is cyanide, a toxic chemical presenting its own handling, processing and disposal issues. This non-acidic process also suffers from relatively high reagent consumption and relatively low recovery of rhodium.

Researchers at the South Dakota School of Mines and Technology have developed certain technologies of extracting precious metals, including gold, silver, copper, nickel, rhenium and platinum group metals from ores and spent catalysts using ammonia and/or halogen salts. See, e.g., U.S. Pat. Nos. 5,114,687; 5,308,381; 5,328,669; and 5,542,957. In general, these processes involve the recovery of precious metals using environmentally benign processes. However, these processes also generally involve higher temperatures and relatively higher pressures, such as in an autoclave.

Another process to recover platinum group metals from various sources involves roasting the source material with one or more of sulfuric acid, a sulfate and/or a bi-sulfate and with one or more halogen salt, and by contacting the roasted product with a leaching solution as disclosed by pending application Ser. No. 10/280,714.

Therefore, a need exists for an improved process of recovering platinum group metals, gold and/or rhenium from a variety of sources.

SUMMARY OF THE INVENTION

This invention relates to the recovery of precious metals and, more particularly, to the recovery of precious metals, such as platinum group metals, gold and rhenium, from various sources using a solution comprising at least one ammonium salt, at least one halogen salt and at least one oxidant.

DETAILED DESCRIPTION OF THE INVENTION

Figure 1:
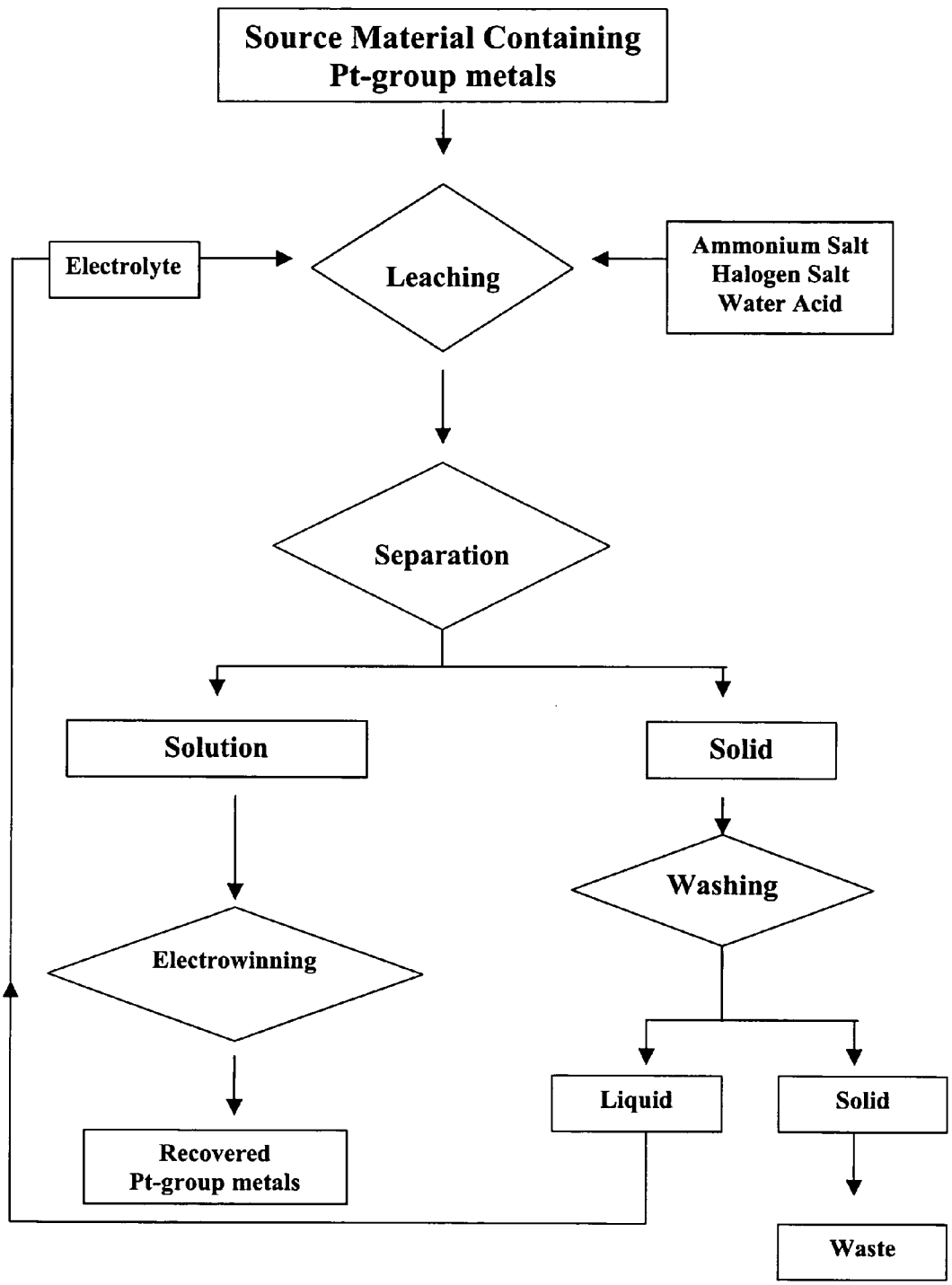
FIG. 1 is a flow chart depicting one embodiment of the invention to recover precious metals from a source.

Platinum group metals, gold and rhenium are extracted from primary sources, such as their native state and complex ores, and from secondary or other sources, such as refractory ores, scrap, automobile catalytic converters, petroleum and chemical catalysts and roasted or smelted products. In general, the platinum group metals, gold and/or rhenium are extracted from their elemental state, complex ores and other materials such as catalysts by leaching the source material with a solution comprising an ammonium salt, a halogen salt and a gaseous oxidant. Water may be added to increase the physical contact between the desired reactant. Acidity may be maintained by adding an appropriate acid. To facilitate the dissolution reaction, the resulting solution may be heated. Platinum group metals, gold and/or rhenium that is leached out into the solution may be recovered and the leaching solution may be recycled.

To prepare a quantity of source material for extracting platinum group metals, gold and/or rhenium, the source material optionally may be crushed, preferably to a size of approximately less than 3 mesh, more preferably less than approximately 10 mesh, and even more preferably less than approximately 60 mesh. In the case of the source material being spent or partially spent catalysts, the platinum group metals, gold and/or rhenium desired to be extracted typically reside on or near the surface of the catalyst matrix. Crushing the source material typically increases the amount of surface area, the number of reaction sites, the rate of reaction and the relative amount of platinum group metal, gold and/or rhenium extracted, among other things. Alternatively, the source material is not required to be crushed, as long as the roasting mixture is capable of providing sufficient physical contact between the source material and the constituents in the leaching solution.

In one embodiment of the invention, platinum group metals, gold and/or rhenium are recovered from various sources by a leaching solution comprising an ammonium salt, a halogen salt and a gaseous oxidant.

Ammonium salts may be introduced by any ammonium-containing compound that is capable of contributing ammonium salt ($NH_4^+$) to the leaching solution, such as, e.g., ammonium sulfate, ammonium iodide, ammonium bromide, ammonium chloride, ammonium fluoride, ammonium acetate, ammonium carbonate, ammonium chromate, ammonium nitrate, ammonium oxalate, ammonium phosphate, and mixtures and combinations thereof. Preferably, ammonium salts of a halogen are used. Although the reaction mechanism is not completely understood and without being bound to a particular theory, it is believed that the ammonium salt acts as a catalyst to facilitate the oxidation of the platinum group metal, gold and/or rhenium and therefore its dissolution into the solution. Ammonium salts preferably are added in amounts sufficient to assist the dissolution reaction and preferably the concentration of ammonium salts are approximately 0.001 gram-moles per liter of the solution to approximately 2 gram-moles per liter of the solution.

Another ingredient in the leaching solution may be one or more halogen salts, alone or in combination with one or more others. The halogen salt may be introduced by any halogen-containing compound that is capable of contributing a halogen salt into the leaching solution, such as, e.g., hydrogen chloride, hydrogen bromide, hydrogen iodide, hydrogen fluoride, sodium, potassium or ammonium chlorides; sodium, potassium or ammonium bromides; sodium, potassium or ammonium iodides; sodium, potassium or ammonium fluorides; and mixtures or combinations of one or more thereof. Preferably, ammonium chloride, ammonium bromide, ammonium iodide, ammonium fluoride, or mixtures thereof, are used. More preferably, ammonium bromide is used. Halogen salts are added in amounts sufficient to assist the dissolution reaction and preferably the concentration of halogen salts are approximately 0.01 gram-moles per liter of the solution to approximately 2 gram-moles per liter of the solution.

The ammonium salt and the halogen salt may be introduced into the leaching solution through separate compounds such as ammonium sulfate and hydrogen fluoride. However, it is preferred to use an ammonium salt of a halogen. By using an ammonium salt of a halogen, both the ammonium salt and the halogen salt may be contributed to the leaching solution by a single compound, thereby making the process more simple and efficient. Even more preferably, ammonium fluoride, ammonium bromide, ammonium chloride and ammonium iodide is used.

Yet another ingredient in the leaching is an oxidant, preferably an oxidant with relatively high oxidation potential. Although the oxidant may be in liquid or even solid form, preferably the oxidant is gaseous, such as nitrosyl chloride (NOCl), chlorine, bromine, fluorine, ozone and various nitrogen oxides.

The oxidant may be introduced as a gas, or preferably introduced as liquid components that generate a suitable oxidant. One relatively straightforward process to synthesize suitable gaseous oxidants comprises mixing a proper proportion of hydrochloric acid and nitric acid, both liquids, which typically generates gaseous nitrosyl chloride and nitrogen oxides. For example, 20 ml of nitric acid and 20 ml of hypochloric acid may be added in a 500 ml solution containing 50 grams of metal bearing materials. In this case, about one-half of these acids will convert to the desired gaseous oxidants.

Alternatively, a nitrate, such as sodium, potassium or ammonium nitrate, may be mixed with the hypocholorite, such as sodium, potassium or ammonium hypochlorite, to generate suitable gaseous oxidants.

Water also may be added in sufficient amounts to obtain the preferred leaching solution of ammonium salt, halogen salt, and a gaseous oxidant. The pH of the solution preferably is between approximately 0.5 and approximately 10 and more preferably between approximately 1 and approximately 8, and even more preferably less than approximately 7. An acid, such as sulfuric acid, may be added to the solution to maintain the desired pH. If sulfuric acid is desired to be added, the concentration is preferably approximately 0.001 gram-moles per liter to approximately 1.0 gram-moles per liter. Additionally, the sulfuric acid advantageously may be used to extract certain metals, such as rhodium and rhenium, from difficult sources, such as catalysts and complex ores.

In a preferred embodiment, the ammonium salt, halogen salt and gaseous oxidant are introduced into a reaction vessel with the source material in sufficient amounts to leach the desired metals out of the source material and into the solution. Preferably, the ingredients to the leaching solution are added in amounts of approximately 3 times the stoichiometric amount to drive the reaction.

One embodiment of the invention is depicted by the flow chart of FIG. 1. A source material containing at least one precious metal, such as a platinum group metal, is added to a solution comprising an ammonium salt, halogen salt, water and acid. At least a portion of the precious metal is leached out of the source material. The resulting product, typically a slurry, is then separated into a solution and a solid. The precious metal is recovered from the solution by electrowinning and the remaining liquids may be recycled to the leaching solution. After washing, the solid may be disposed of as waste and the liquid may be recycled to the leaching solution.

The reaction can take place at room temperatures and ambient pressures. However, to further assist the dissolution of desired metals, the source material and leaching solution may be heated, preferably to approximately 50° C. to approximately 150° C., more preferably less than the boiling point of water, and even more preferably approximately 60° C. to approximately 90° C. The temperature may be greater than the boiling point of water to achieve a faster dissolution rate, or when materials containing precious metals are refractory in nature, although it is not necessary to do so due to the favorable reactions with the ingredients disclosed. Unlike many prior processes, the muention does not require elevated pressures, such as an autoclave. Rather, the process may be performed at ambient or near ambient pressures.

After the platinum group metals, gold and/or rhenium are leached out of the source material and into the solution, these metals are removed from the solution. Preferably, all the solids are removed from the solution by filtering followed by washing. Since typical filtering systems operate at approximately 50° C. to 60° C., the solution may be allowed to cool or be cooled before such filtering. Preferably, the desired metals and/or metal compounds are removed, such as by electrowinning, solvent extraction or chemical precipitation.

The remaining solution preferably is recycled back to the leaching solution into the reaction vessel. Continuous recycling reduces the consumption of lixivants. For example, iodide would be oxidized to iodine or tri-iodide due to the presence of oxidants under the process disclosed. Iodine itself is a powerful oxidant that is believed to be responsible in assisting to extract the desired metals into solution. During the course of the extraction process, iodine is reduced back to iodide again. This cyclic process continues as long as other oxidants are present in the system.

The process of the present invention has been shown to achieve excellent results for the recovery of gold form refractory gold ores. For example, better than 90% recovery of gold was obtained from numerous refractory gold ores and also electronic scrap at temperatures typically less than 90° C. with leaching times of approximately one to three hours.

The following examples represent the results of numerous tests and results of a variety of source materials, other ingredients, conditions, and other variables. It will be understood that similar results could be attained with other conditions or combination of conditions, or with other ingredients or combination of ingredients, or with other changing other variables or combination of variables. The following examples are illustrative but are not limitations of the inventions disclosed herein.

In the following examples, numerous types of catalytic converters were tested. In addition, jewelry scrap, dental scrap and various ore samples were also used to demonstrate the applicability of the invention to source materials other than automobile catalytic converters.

EXAMPLE I

In this example, the following quantities of the following ingredients were added to a glass reaction vessel.

| Item | Ingredient | Quantity |
|---|---|---|
| A. | honeycomb type auto catalysts | 50 grams |
| B. | concentrated $H_2SO_4$ | 20 ml |
| C. | ammonium bromide | 0.4 moles |
| D. | ammonium iodide | 0.01 moles |
| E. | concentrated $HNO_3$ | 15 ml |
| F. | concentrated HCl | 15 ml |
| G. | water | 400 ml |

Item A was a ground material passing through a US standard screen of 60 mesh per inch from spent automobile catalytic converters and consisted of 800 ppm of platinum, 260 ppm of palladium and 195 ppm of rhodium imbedded in an alumina-silicate matrix of honeycomb structure.

A one liter glass reactor vessel was placed on a heating mantle whose temperature was controlled using a rheostat. The reaction temperature was raised to about 90° C. and the reaction was proceeded for about two hours. After the dissolution reaction, the solution was then separated from the solid by filtration.

The recovery of platinum, palladium and rhodium was evaluated by analyzing the contents of these metals in the solution using an Atomic Absorption Spectrophotometer/Induced Coupled Plasma. The solid residue was also analyzed by fire-assay to confirm the final recovery.

The recovery values of platinum, palladium and rhodium were found to be 95%, 98% and 93%, respectively.

EXAMPLE II

In this example, the following quantities of the following ingredients were added to a glass reaction vessel.

| Item | Ingredient | Quantity |
|---|---|---|
| A. | dental scrap | 50 grams |
| B. | concentrated $H_2SO_4$ | 20 ml |
| C. | ammonium bromide | 0.4 moles |
| D. | ammonium iodide | 0.01 moles |
| E. | concentrated $HNO_3$ | 15 ml |
| F. | concentrated HCl | 15 ml |
| G. | water | 400 ml |

Item A was an incinerated dental scrap ash, all of which is passing through a US standard screen of 60 mesh. It contains typically about 19,000 ppm of gold, 500 ppm of platinum, 1,800 ppm of palladium and about 70 ppm of rhodium.

A one liter glass reactor vessel was placed on a heating mantle whose temperature was controlled using a rheostat. The reaction temperature was raised to about 90° C. and the reaction was proceeded for about two hours. After the dissolution reaction, the solution was then separated from the solid by filtration.

The recovery of gold, platinum, palladium and rhodium was evaluated by analyzing the contents of these metals in the solution using an Atomic Absorption Spectrophotometer/Induced Coupled Plasma. The solid residue was also analyzed by fire-assay to confirm the final recovery.

The recovery values of gold, platinum, palladium and rhodium were found to be 99%, 98%, 98% and 90%, respectively.

EXAMPLE III

In this example, the following quantities of the following ingredients were added to a glass reaction vessel.

| Item | Ingredient | Quantity |
|---|---|---|
| A. | gold jewelry scrap type A | 50 grams |
| B. | concentrated $H_2SO_4$ | 20 ml |
| C. | ammonium bromide | 0.4 moles |
| D. | ammonium iodide | 0.01 moles |
| E. | concentrated $HNO_3$ | 15 ml |
| F. | concentrated HCl | 15 ml |
| G. | water | 400 ml |

Item A was an incinerated gold jewelry ash, all of which is passing through a US standard screen of 60 mesh. It contains typically about 55,000 ppm of gold, 20 ppm of platinum, and 30 ppm of palladium.

A one liter glass reactor vessel was placed on a heating mantle whose temperature was controlled using a rheostat. The reaction temperature was raised to about 90° C. and the reaction was proceeded for about two hours. After the dissolution reaction, the solution was then separated from the solid by filtration.

The recovery of gold, platinum, and palladium was evaluated by analyzing the contents of these metals in the solution using an Atomic Absorption Spectrophotometer/Induced Coupled Plasma. The solid residue was also analyzed by fire-assay to confirm the final recovery.

The recovery values of gold, platinum, and palladium were found to be 99%, 94%, and 95%, respectively.

EXAMPLE IV

In this example, the following quantities of the following ingredients were added to a glass reaction vessel.

| Item | Ingredient | Quantity |
| --- | --- | --- |
| A. | petroleum refinery catalysts | 20 grams |
| B. | concentrated $H_2SO_4$ | 20 ml |
| C. | ammonium bromide | 0.4 moles |
| D. | ammonium iodide | 0.01 moles |
| E. | sodium nitrate | 20 grams |
| F. | concentrated HCl | 15 ml |
| G. | water | 400 ml |

Item A was a ground material passing through a US standard screen of 60 mesh per inch from spent automobile catalytic converters and consisted of 2,950 ppm of platinum and 2,500 ppm of rhenium imbedded in alumina matrix of pellet shape.

A one liter glass reactor vessel was placed on a heating mantle whose temperature was controlled using a rheostat. The reaction temperature was raised to about 90° C. and the reaction was proceeded for about two hours. After the dissolution reaction, the solution was then separated from the solid by filtration.

The recovery of gold, platinum, palladium and rhodium was evaluated by analyzing the contents of these metals in the solution using an Atomic Absorption Spectrophotometer/Induced Coupled Plasma. The solid residue was also analyzed by fire-assay to confirm the final recovery.

The recovery values of platinum and rhenium were found to be 90% and 95%, respectively.

EXAMPLE V

In this example, the following quantities of the following ingredients were added to a glass reaction vessel.

| Item | Ingredient | Quantity |
| --- | --- | --- |
| A. | refractory gold ore sample A | 100 grams |
| B. | concentrated $H_2SO_4$ | 20 ml |
| C. | ammonium bromide | 0.4 moles |
| D. | ammonium iodide | 0.01 moles |
| E. | concentrated $HNO_3$ | 15 ml |
| F. | concentrated HCl | 15 ml |
| G. | water | 400 ml |

Item A was a sulfidic refractory gold ore containing about 6.2 grams of gold per ton of ore. Gold is associated with sulfides such as pyrite or arsenopyrite.

A one liter glass reactor vessel was placed on a heating mantle whose temperature was controlled using a rheostat. The reaction temperature was raised to about 90° C. and the reaction was proceeded for about two hours. After the dissolution reaction, the solution was then separated from the solid by filtration.

The recovery of gold was evaluated by analyzing the contents of these metals in the solution using an Atomic Absorption Spectrophotometer/Induced Coupled Plasma. The solid residue was also analyzed by fire-assay to confirm the final recovery.

The recovery of gold was found to be about 92%.

EXAMPLE VI

In this example, the following quantities of the following ingredients were added to a glass reaction vessel.

| Item | Ingredient | Quantity |
| --- | --- | --- |
| A. | honeycomb type auto catalysts | 50 grams |
| B. | ammonium bromide | 20 grams |
| C. | ammonium iodide | 10 grams |
| D. | concentrated HF | 5 ml |
| E. | concentrated HCl | 5 ml |
| F. | concentrated $HNO_3$ | 5 ml |
| G. | water | 400 ml |

Item A was a ground material passing through a US standard screen of 60 mesh per inch from spent automobile catalytic converters consisted of 1,000 ppm of platinum, 300 ppm of palladium and 200 ppm of rhodium imbedded in an alumina-silicate matrix of honeycomb structure.

A one liter glass reactor vessel was placed on a heating mantle whose temperature was controlled using a rheostat. The reaction temperature was raised to about 90° C. and the reaction was proceeded for about one hour. After the dissolution reaction, the solution was then separated from the solid by filtration.

The recovery of platinum, palladium and rhodium was evaluated by analyzing the contents of these metals in the solution using an Atomic Absorption Spectrophotometer/Induced Coupled Plasma. The solid residue was also analyzed by fire-assay to confirm the final recovery.

The recovery values of platinum, palladium and rhodium were found to be 95%, 98% and 93%, respectively. This demonstration also has shown that high recovery of pt-group metals can be achieved without roasting as long as sufficient amounts of halogen elements are present in the leaching system.

EXAMPLE VII

In this example, the following quantities of the following ingredients were added to a glass reaction vessel.

| Item | Ingredient | Quantity |
| --- | --- | --- |
| A. | honeycomb type auto catalysts | 0.1 grams |
| B. | ammonium bromide | 10 grams |
| C. | ammonium iodide | 5 grams |
| D. | ethyl alcohol | 5 ml |
| E. | concentrated $HNO_3$ | 10 ml |
| F. | water | 200 ml |

Item A was a −0.200 mesh chemical grade platinum metal powder. A 500 ml glass vessel was placed on a heating mantle whose temperature was controlled using a rheostat.

The reaction temperature was raised to about 90° C. and the platinum powder was completely dissolved in 30 min.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

We claim:

1. A method of recovering a precious metal from a source material, comprising the steps of:
    a) contacting a source material comprising at least one precious metal with a solution comprising an ammonium salt, a halogen salt and an oxidant, wherein the oxidant is gaseous and is provided to the solution by the introduction of at least a first liquid reagent and at least a second liquid reagent; and
    b) recovering at least a portion of the at least one precious metal from the solution.

2. The method of claim 1, wherein an ammonium salt is provided to the solution by an ammonium-containing compound selected from the group consisting of ammonium sulfate, ammonium iodide, ammonium bromide, ammonium chloride, ammonium fluoride, ammonium acetate, ammonium carbonate, ammonium chromate, ammonium nitrate, ammonium oxalate, ammonium phosphate, and mixtures and combinations thereof.

3. The method of claim 1, wherein the concentration of the ammonium salt is approximately 0.01 gram-moles per liter to approximately 2 gram-moles per liter of the solution.

4. The method of claim 1, wherein the halogen salt is provided to the solution by a halogen containing compound selected from the group consisting of hydrogen chloride, hydrogen bromide, hydrogen iodide, hydrogen fluoride, sodium chloride, sodium bromide, sodium iodide, sodium fluoride, potassium chloride, potassium bromide, potassium iodide, potassium fluoride, ammonium chloride, ammonium bromide, ammonium iodide, ammonium fluoride, and mixtures and combinations thereof.

5. The method of claim 1, wherein the concentration of the halogen salt is approximately 0.01 gram-moles per liter of solution to approximately 2 gram-moles per liter.

6. The method of claim 1, wherein the ammonium salt is provided to the solution by an ammonium containing compound selected from the group consisting of ammonium iodide, ammonium bromide, ammonium chloride, ammonium fluoride, ammonium acetate, ammonium carbonate, ammonium chromate, ammonium nitrate, ammonium oxalate, ammonium phosphate, and mixtures and combinations thereof, and the halogen salt is provided to the solution by a halogen containing compound selected from the group consisting of ammonium iodide, ammonium bromide, ammonium chloride, ammonium fluoride, and mixtures and combinations thereof.

7. The method of claim 1, wherein the oxidant is selected from the group consisting of nitrogen oxides, nitrosyl chloride, chlorine, bromine, iodine, fluorine, and ozone and hypoclorite.

8. The method of claim 1, wherein the first liquid reagent is selected from the group consisting of hypochloric acid, sodium hypochlorite, potassium hypochlorite, ammonium hypochlorite, alcohol, and mixtures and combinations thereof, and the second liquid reagent is selected from the group consisting of nitric acid, sodium nitrate, potassium nitrate, ammonium nitrate, and mixtures and combinations thereof.

9. The method of claim 1, wherein the contacting step is performed at approximately ambient pressure.

10. The method of claim 1, further comprising the step of heating the solution to a temperature less than approximately 150 degrees Celsius.

11. The method of claim 10, wherein the temperature is in the range of approximately 50 degrees Celsius to approximately 100 degrees Celsius.

12. The method of claim 1, wherein the pH of the solution is less than approximately 10.

13. The method of claim 1, wherein the pH of the solution is approximately 0.5 to approximately 8.

14. The method of claim 1, wherein the solution further comprises an acid.

15. The method of claim 1, wherein the at least one precious metal is selected from the group consisting of platinum, iridium, osmium, palladium, rhodium, ruthenium, gold, and rhenium.

16. A method of separating a precious metal from a source material, comprising the steps of:
    a) combining a source material containing at least one precious metal with a solution comprising at least one ammonium salt, at least halogen salt and at least one gaseous oxidant, wherein the oxidant is provided to the solution by the introduction of at least a first liquid reagent and at least a second liquid reagent; and
    b) separating at least a portion of the at least one precious metal from the solution.

17. The method of claim 16, wherein the at least one ammonium salt is provided to the solution by an ammonium-containing compound selected from the group consisting of ammonium sulfate, ammonium iodide, ammonium bromide, ammonium chloride, ammonium fluoride, and mixtures and combinations thereof.

18. The method of claim 16, wherein the concentration of the ammonium salt is approximately 0.001 gram-moles per liter to approximately 2 gram-moles per liter of the solution.

19. The method of claim 16, wherein the halogen salt is provided to the solution by a halogen containing compound selected from the group consisting of hydrogen chloride, hydrogen bromide hydrogen iodide, hydrogen fluoride, sodium chloride, sodium bromide, sodium iodide, sodium fluoride, potassium chloride, potassium bromide, potassium iodide, potassium fluoride, ammonium chloride, ammonium bromide, ammonium iodide, ammonium fluoride, and mixtures and combinations thereof.

20. The method of claim 16, wherein the concentration of the halogen salt is approximately 0.01 gram-moles per liter of solution to approximately 2 gram-moles per liter.

21. The method of claim 16, wherein the ammonium salt is provided to the solution by an ammonium containing compound selected from the group consisting of ammonium iodide, ammonium bromide, ammonium chloride, ammonium fluoride, ammonium acetate, ammonium carbonate, ammonium chromate, ammonium nitrate, ammonium oxalate, ammonium phosphate, and mixtures and combinations thereof, and the halogen salt is provided to the solution by a halogen containing compound selected from the group consisting of ammonium iodide, ammonium bromide, ammonium chloride, ammonium fluoride, and mixtures and combinations thereof.

22. The method of claim 16, wherein the oxidant is selected from the group consisting of nitrogen oxides, nitrosyl chloride, chlorine, bromine, iodine, fluorine, and ozone and hypoclorite.

23. The method of claim 16, wherein the first liquid reagent is selected from the group consisting of hypochloric acid, sodium hypochlorite, potassium hypochlorite, ammonium hypochlorite, and mixtures and combinations thereof, and the second liquid reagent is selected from the group consisting of nitric acid, sodium nitrate, potassium nitrate, ammonium nitrate, and mixtures and combinations thereof.

24. The method of claim 16, wherein the combining step is performed at approximately ambient pressure.

25. The method of claim 16, further comprising heating the solution to a temperature less than approximately 150 degrees Celsius.

26. The method of claim 16, further comprising heating the solution to a temperature in the range of approximately 50 degrees Celsius to approximately 100 degrees Celsius.

27. The method of claim 16, wherein the pH of the solution is less than approximately 10.

28. The method of claim 16, wherein the pH of the solution is approximately 0.5 to approximately 8.

29. The method of claim 16, wherein the solution further comprises an acid.

30. The method of claim 16, wherein the at least one precious metal is selected from the group consisting of platinum, iridium, osmium, palladium, rhodium, ruthenium, gold, and rhenium.

31. A method of extracting a precious metal from a source material comprising the steps of:
  a) charging to a reaction zone a solution comprising at least one ammonium salt, at least one halogen salt, at least one acid, water, and a source material containing at least one precious metal;
  b) heating the reaction zone to a temperature of approximately 50 degrees Celsius to approximately 100 degrees Celsius under oxidizing conditions to form a slurry, wherein the oxidizing conditions are provided by a gaseous oxidant that is provided to the solution by the introduction of at least a first liquid reagent and at least a second liquid reagent; and
  c) separating the at least one precious metal from the slurry.

32. The method of claim 31, wherein the at least one ammonium salt is provided to the solution by an ammonium-containing compound selected from the group consisting of ammonium sulfate, ammonium iodide, ammonium bromide, ammonium chloride, ammonium fluoride, ammonium acetate, ammonium carbonate, ammonium chromate, ammonium nitrate, ammonium oxalate, ammonium phosphate, and mixtures and combinations thereof.

33. The method of claim 31, wherein the concentration of the at least one ammonium salt is approximately 0.01 gram-mole per liter to approximately 2 gram-moles per liter of the solution.

34. The method of claim 31, wherein the at least one halogen salt is provided to the solution by a halogen containing compound selected from the group consisting of hydrogen chloride, hydrogen bromide hydrogen iodide, hydrogen fluoride, sodium chloride, sodium bromide, sodium iodide, sodium fluoride, potassium chloride, potassium bromide, potassium iodide, potassium fluoride, ammonium chloride, ammonium bromide, ammonium iodide, ammonium fluoride, and mixtures and combinations thereof.

35. The method of claim 31, wherein the concentration of the at least one halogen salt is approximately 0.01 gram-moles per liter of solution to approximately 2 gram-moles per liter.

36. The method of claim 31, wherein the ammonium salt is provided to the solution by an ammonium containing compound selected from the group consisting of ammonium iodide, ammonium bromide, ammonium chloride, ammonium fluoride, ammonium acetate, ammonium carbonate, ammonium chromate, ammonium nitrate, ammonium oxalate, ammonium phosphate, and mixtures and combinations thereof, and the halogen salt is provided to the solution by a halogen containing compound selected from the group consisting of ammonium iodide, ammonium bromide, ammonium chloride, ammonium fluoride, and mixtures and combinations thereof.

37. The method of claim 31, wherein the oxidant is selected from the group consisting of nitrogen oxides, nitrosyl chloride, chlorine, bromine, iodine, fluorine, ozone, and mixtures and combinations thereof.

38. The method of claim 31, wherein the first liquid reagent is selected from the group consisting of hypochloric acid, sodium hypochlorite, potassium hypochlorite, ammonium hypochlorite, and mixtures and combinations thereof, and the second liquid reagent is selected from the group consisting of nitric acid, sodium nitrate, potassium nitrate, ammonium nitrate, and mixtures and combinations thereof.

39. The method of claim 31, wherein the reaction zone is at an approximately ambient pressure.

40. The method of claim 31, wherein the reaction zone is heated to a temperature of approximately 60 degrees Celsius to approximately 90 degrees Celsius.

41. The method of claim 31, wherein the reaction zone is heated to a temperature of approximately 60 degrees Celsius to approximately 90 degrees Celsius and the pressure is approximately ambient.

42. The method of claim 31, wherein the pH of the solution is less than approximately 10.

43. The method of claim 31, wherein the pH of the solution is approximately 0.5 to approximately 8.

44. The method of claim 31, wherein the at least one acid is selected from the group consisting of sulfuric acid, nitric acid, hypochloric acid, phosphoric acid, and mixtures and combinations thereof.

45. The method of claim 31, wherein the at least one precious metal is selected from the group consisting of platinum, iridium, osmium, palladium, rhodium, ruthenium, gold, and rhenium.

* * * * *